(12) United States Patent
Shen et al.

(10) Patent No.: US 11,087,024 B2
(45) Date of Patent: Aug. 10, 2021

(54) SYSTEM AND METHOD TO ENABLE PRIVACY-PRESERVING REAL TIME SERVICES AGAINST INFERENCE ATTACKS

(71) Applicant: Samsung Electronics Co., Ltd., Suwon-si (KR)

(72) Inventors: Yilin Shen, Sunnyvale, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/011,368

(22) Filed: Jan. 29, 2016

(65) Prior Publication Data

US 2017/0220817 A1   Aug. 3, 2017

(51) Int. Cl.
*G06F 21/62* (2013.01)
*H04W 12/00* (2021.01)
(Continued)

(52) U.S. Cl.
CPC ...... *G06F 21/6254* (2013.01); *H04L 63/1475* (2013.01); *H04W 12/0013* (2019.01); *H04W 12/02* (2013.01)

(58) Field of Classification Search
CPC ............ G06F 21/6254; G06F 21/6245; G06F 21/6227; G06F 21/55; G06F 21/604;
(Continued)

(56) References Cited

U.S. PATENT DOCUMENTS 8,832,841 B2   9/2014   Archer et al.
8,914,893 B2   12/2014   Zhao et al.
(Continued)

FOREIGN PATENT DOCUMENTS

EP   2448303 B1   2/2014
JP   2009-081487 A   4/2009
(Continued)

OTHER PUBLICATIONS

Kara et al., "Distortions in QoE Measurements of Ubiquitous Mobile Video Services Caused by the Preconceptions of Test Subjects," 2012 IEEE/IPSJ 12th International Symposium on Applications and the Internet Year: 2012 | Conference Paper | Publisher: IEEE.*

(Continued)

*Primary Examiner* — Roderick Tolentino
(74) *Attorney, Agent, or Firm* — Sherman IP LLP; Kenneth L. Sherman; Hemavathy Perumal

(57) ABSTRACT

One embodiment provides a method comprising receiving general private data identifying at least one type of privacy-sensitive data to protect, collecting at least one type of real-time data, and determining an inference privacy risk level associated with transmitting the at least one type of real-time data to a second device. The inference privacy risk level indicates a degree of risk of inferring the general private data from transmitting the at least one type of real-time data. The method further comprises distorting at least a portion of the at least one type of real-time data based on the inference privacy risk level before transmitting the at least one type of real-time data to the second device.

20 Claims, 12 Drawing Sheets

(51) Int. Cl.
*H04W 12/02* (2009.01)
*H04L 29/06* (2006.01)

(58) Field of Classification Search
CPC . H04L 63/1475; H04L 63/0407; H04L 63/08; H04L 63/0421; H04W 12/02; H04W 8/16; H04W 12/37; H04W 12/033
See application file for complete search history.

(56) References Cited

U.S. PATENT DOCUMENTS

| | | | |
|---|---|---|---|
| 8,918,882 B2 | 12/2014 | Bettini et al. | |
| 8,966,649 B2 | 2/2015 | Stack et al. | |
| 8,984,628 B2 | 3/2015 | Mahaffey et al. | |
| 9,060,236 B2* | 6/2015 | Engdegard | H04S 3/008 |
| 2006/0123461 A1 | 6/2006 | Lunt et al. | |
| 2008/0052328 A1* | 2/2008 | Widhelm | H04L 63/1408 |
| 2011/0047594 A1 | 2/2011 | Mahaffey et al. | |
| 2011/0258206 A1* | 10/2011 | El Emam | G06F 21/577 |
| | | | 707/754 |
| 2012/0023586 A1 | 1/2012 | Flickner et al. | |
| 2013/0097417 A1 | 4/2013 | Lauter et al. | |
| 2013/0212684 A1 | 8/2013 | Li et al. | |
| 2013/0263260 A1 | 10/2013 | Mahaffey et al. | |
| 2013/0318568 A1 | 11/2013 | Mahaffey et al. | |
| 2013/0340086 A1* | 12/2013 | Blom | G06F 21/6245 |
| | | | 726/26 |
| 2014/0019985 A1* | 1/2014 | Krajec | G06F 9/4806 |
| | | | 718/102 |
| 2014/0196158 A1 | 7/2014 | Buck | |
| 2014/0214610 A1 | 7/2014 | Moshir et al. | |
| 2014/0215551 A1 | 7/2014 | Allain et al. | |
| 2014/0304822 A1 | 10/2014 | Sher-Jan et al. | |
| 2014/0310770 A1 | 10/2014 | Mahaffey | |
| 2014/0380413 A1 | 12/2014 | Archer et al. | |
| 2015/0106614 A1 | 4/2015 | Lee et al. | |
| 2015/0128287 A1* | 5/2015 | LaFever | H04L 63/0407 |
| | | | 726/27 |
| 2015/0169877 A1 | 6/2015 | Mahaffey et al. | |
| 2015/0178744 A1* | 6/2015 | Noyes | G06Q 30/0202 |
| | | | 705/7.29 |
| 2015/0278534 A1* | 10/2015 | Thiyagarajan | G06F 21/62 |
| | | | 726/28 |
| 2015/0379275 A1 | 12/2015 | Fawaz et al. | |
| 2016/0134638 A1* | 5/2016 | Tulshibagwale | G06Q 20/123 |
| | | | 726/4 |
| 2016/0350557 A1* | 12/2016 | Mikami | G06F 16/2282 |
| 2017/0048245 A1* | 2/2017 | Owen | G06F 21/6245 |
| 2017/0120141 A1* | 5/2017 | Baddoo | A63F 9/0612 |

FOREIGN PATENT DOCUMENTS

| | | |
|---|---|---|
| JP | 2013-145574 A | 7/2013 |
| KR | 10-2014-0039361 A | 4/2014 |
| WO | 2014204487 A1 | 12/2014 |

OTHER PUBLICATIONS

Raphel et al., "SSIM based resource optimization for multiuser downlink OFDM video transmission Systems," 2016 IEEE Region 10 Conference (TENCON) Year: 2016 | Conference Paper | Publisher: IEEE.*

Pattuk, E. et al., "Privacy-aware dynamic feature selection", Proceedings of the 2015 IEEE 31st International Conference on Data Engineering (ICDE), Apr. 13-17, 2015, pp. 78-88, IEEE, United States.

Makhdoumi, A. et al., "From the Information Bottleneck to the Privacy Funnel", Proceedings of the 2014 IEEE Information Theory Workshop (ITW), Nov. 2-5, 2014, pp. 501-505, IEEE, United States.

Salamatian, S. et al., "SPPM: Sparse Privacy Preserving Mappings", Proceedings of the 2014 Conference on Uncertainty in Artificial Intelligence (UAI 2014), Jul. 23-27, 2014, pp. 1-10, United States.

International Search Report and Written Opinion dated Sep. 12, 2016 for International Application PCT/KR2016/005943 from Korean Intellectual Property Office, pp. 1-13, Republic of Korea.

European Office Action dated Mar. 5, 2019 for European Application No. 16888276.9 from European Patent Office, pp. 1-6, Munich, Germany.

European Office Action dated Nov. 14, 2019 for European Application No. 16888276.9 from European Patent Office, pp. 1-8, Munich, Germany.

Korean Notice of Allowance dated Jun. 8, 2020 for Korean Patent Application No. 20187023778 from Korean Intellectual Property Office, pp. 1-7 Seal, South Korea, (English-language translation included pp. 1).

European Office Action dated Dec. 2, 2020 for European Application No. 16888276.9 from European Patent Office, pp. 1-6, Munich, Germany.

Extended European Search Report dated Oct. 11, 2018 for European Application No. 16888276.9 from European Patent Office, pp. 1-8, Munich, Germany.

* cited by examiner

SYSTEM AND METHOD TO ENABLE PRIVACY-PRESERVING REAL TIME SERVICES AGAINST INFERENCE ATTACKS

TECHNICAL FIELD

One or more embodiments relate generally to privacy protection, and in particular, a system and method to enable privacy-preserving real-time services against inference attacks.

BACKGROUND

Service providers offer a variety of real-time services to users. Examples of real-time services include personalized services such as intelligent assistant, targeted advertising, media streaming, etc. A personalized service offered to a user may be based on data relating to the user ("user data"). Oftentimes, service providers require a substantial amount of user data in order to provide high-quality personalized services to users.

For example, electronic devices such as mobile phones and Internet of Things (IoT) devices monitor and collect real-time device sensed data, release the real-time device sensed data to service providers, and receive personalized services from the service providers. Users may select types of user data to release to the service providers (e.g., user data that is deemed to have low or no privacy risks); unfortunately, private user data may be inferred from even user data that is deemed to have low or no privacy risks.

Traditionally, users rely on service providers to protect their private user data. User fears over data privacy have escalated in recent years, however, due to a multitude of data breaches and hacks that result in the release of private user data (e.g., malicious attackers intentionally breaking into a cloud computing environment or a server associated with a service provider to steal private user data maintained by the service provider). Further, malicious attackers may also eavesdrop on user data provided to service providers (e.g., user data that is deemed to have low or no privacy risks), and infer private user data from the user data provided. It would therefore be beneficial to have a new solution so that users do not have to purely rely on service providers to protect their private user data.

In view of increasing concerns from users over data privacy and tightened governmental regulations relating to data privacy, technologies that preserve data privacy and provide users with more control over their private user data are desired. For example, it is desirable for electronic devices to apply data distortion to real-time device sensed data and release the distorted real-time device sensed data to service providers, such that private user data cannot be inferred from the distorted real-time device sensed data; further, the degree/level of data distortion applied to the real-time device sensed data should not compromise the quality of personalized services received from the service providers.

SUMMARY

One embodiment provides a method comprising receiving general private data identifying at least one type of privacy-sensitive data to protect, collecting at least one type of real-time data, and determining an inference privacy risk level associated with transmitting the at least one type of real-time data to a second device. The inference privacy risk level indicates a degree of risk of inferring the general private data from transmitting the at least one type of real-time data. The method further comprises distorting at least a portion of the at least one type of real-time data based on the inference privacy risk level before transmitting the at least one type of real-time data to the second device.

Another embodiment provides a system comprising at least one sensor configured to collect at least one type of real-time data, one or more processors and a data storage device storing instructions that when executed by the one or more processors cause the one or more processors to perform operations. The operations include receiving general private data identifying at least one type of privacy-sensitive data to protect, and determining an inference privacy risk level associated with transmitting the at least one type of real-time data to a first device. The inference privacy risk level indicates a degree of risk of inferring the general private data from transmitting the at least one type of real-time data. The operations further include distorting at least a portion of the at least one type of real-time data based on the inference privacy risk level before transmitting the at least one type of real-time data to the first device.

One embodiment provides a non-transitory computer readable storage medium including instructions to perform a method comprising receiving general private data identifying at least one type of privacy-sensitive data to protect, collecting at least one type of real-time data, and determining an inference privacy risk level associated with transmitting the at least one type of real-time data to a second device. The inference privacy risk level indicates a degree of risk of inferring the general private data from transmitting the at least one type of real-time data. The method further comprises distorting at least a portion of the at least one type of real-time data based on the inference privacy risk level before transmitting the at least one type of real-time data to the second device.

These and other features, aspects and advantages of the one or more embodiments will become understood with reference to the following description, appended claims and accompanying figures.

BRIEF DESCRIPTION OF THE DRAWINGS

FIG. 3B illustrates an example user interface generated by the first user interface unit, in one or more embodiments;

FIG. 3C illustrates an example user interface generated by the second user interface unit, in one or more embodiments;

DETAILED DESCRIPTION

Figure 1:
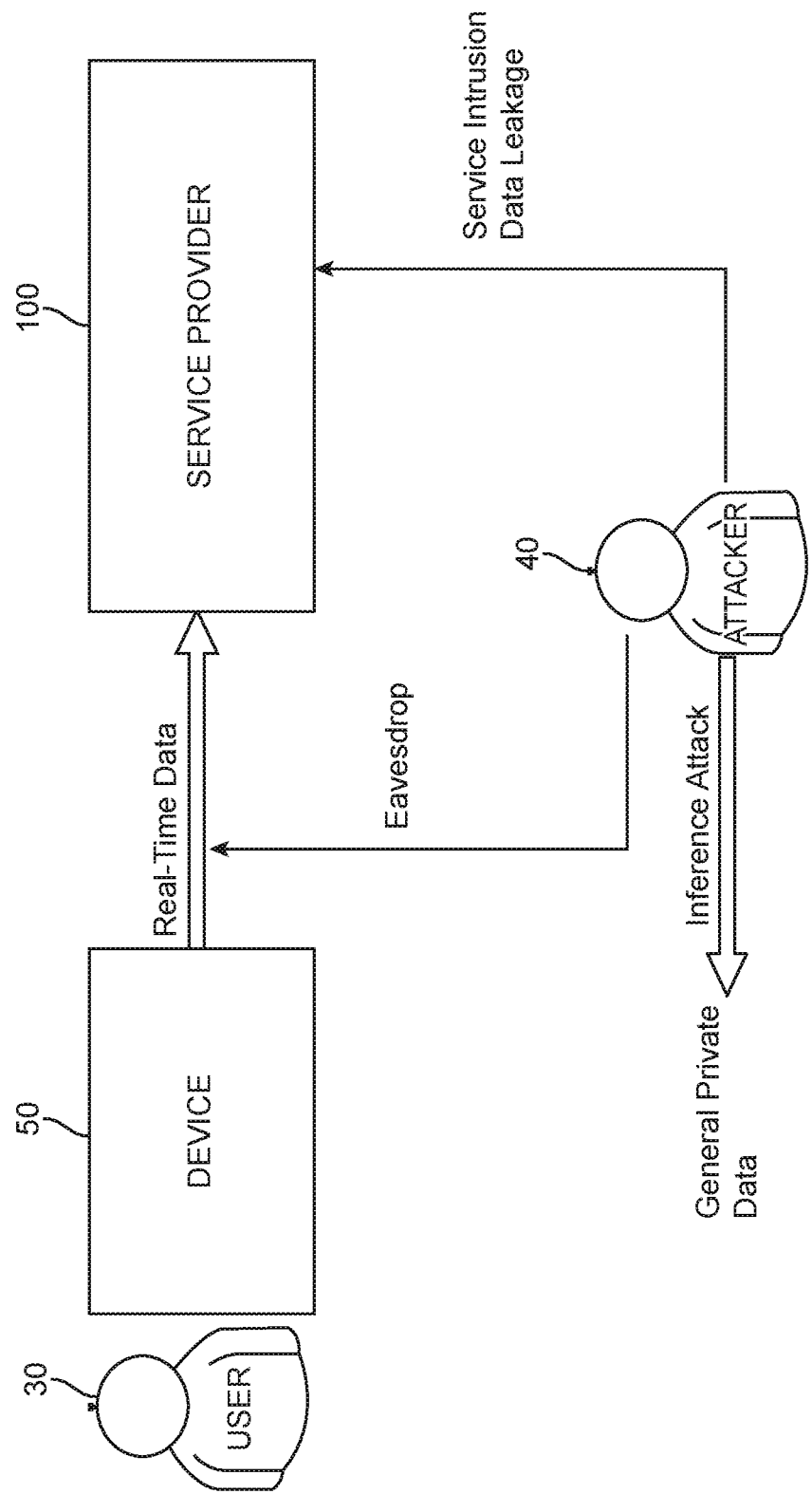
FIG. 1 illustrates an example data breach.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to privacy protection, and in particular, privacy-preserving real-time services against inference attacks. One embodiment provides a method comprising receiving general private data identifying at least one type of privacy-sensitive data to protect, collecting at least one type of real-time data, and determining an inference privacy risk level associated with transmitting the at least one type of real-time data to a second device. The inference privacy risk level indicates a degree of risk of inferring the general private data from transmitting the at least one type of real-time data. The method further comprises distorting at least a portion of the at least one type of real-time data based on the inference privacy risk level before transmitting the at least one type of real-time data to the second device.

Another embodiment provides a system comprising at least one sensor configured to collect at least one type of real-time data, one or more processors and a data storage device storing instructions that when executed by the one or more processors cause the one or more processors to perform operations. The operations include receiving general private data identifying at least one type of privacy-sensitive data to protect, and determining an inference privacy risk level associated with transmitting the at least one type of real-time data to a first device. The inference privacy risk level indicates a degree of risk of inferring the general private data from transmitting the at least one type of real-time data. The operations further include distorting at least a portion of the at least one type of real-time data based on the inference privacy risk level before transmitting the at least one type of real-time data to the first device.

One embodiment provides a non-transitory computer readable storage medium including instructions to perform a method comprising receiving general private data identifying at least one type of privacy-sensitive data to protect, collecting at least one type of real-time data, and determining an inference privacy risk level associated with transmitting the at least one type of real-time data to a second device. The inference privacy risk level indicates a degree of risk of inferring the general private data from transmitting the at least one type of real-time data. The method further comprises distorting at least a portion of the at least one type of real-time data based on the inference privacy risk level before transmitting the at least one type of real-time data to the second device.

In this specification, the term "real-time device sensed data" as used herein generally refers to one or more types of real-time on-device data monitored and collected by an electronic device. Real-time device sensed data is specific to an electronic device (i.e., an electronic device that monitored and collected the real-time device sensed data). Examples of real-time device sensed data monitored and collected by an electronic device may include sensor data, location data, etc. In this specification, the terms "real-time device sensed data" and "real-time data" may be used interchangeably.

In this specification, the term "general private data" as used herein generally refers to one or more types of data that is not specific to any electronic device (i.e., data that is not necessarily monitored and collected by an electronic device). General private data may include private user data associated with a user, such as racial or ethnic origin, political opinions, religious or philosophical beliefs, health condition, age, gender, etc. General private data may be inferred from real-time device sensed data.

In this specification, the term "privacy risk" as used herein represents a degree of risk of inferring general private data from transmitting at least one type of real-time data. In this specification, the terms "privacy risk" and "inference privacy risk level" may be used interchangeably.

In this specification, the terms "distort" and "data distortion" as used herein represent a data processing technique that, when applied to data, manipulates/transforms data from a first form to a second form; the data processing technique applied needs not involve data encryption.

FIG. 1 illustrates an example data breach. An electronic device 50 associated with a user 30 may exchange data with a remote service provider 100 over a connection (e.g., a wireless connection, a wired connection, or a combination of the two). For example, to receive a personalized service from the remote service provider 100, the electronic device 50 may release real-time data associated with the user 30 to the remote service provider 100 over the connection.

Data privacy for the user data released may be compromised in multiple ways. For example, an unauthorized third party 40 (e.g., a malicious attacker) may eavesdrop on the connection, and launch an inference attack in which general private data relating to the user 30 is inferred from the user data released over the connection. As another example, an unauthorized third party 40 may unlawfully intrude into a remote server or a cloud computing environment of the remote service provider 100, and cause a data leakage; general private data relating to the user 30 may be inferred from the data leakage.

Conventional data privacy protection techniques assume that privacy risks associated with data breaches are a given. These techniques do not factor into account user-specified privacy concern levels for different types of user data. Further, conventional data privacy protection techniques are not universally applicable to different applications and/or services.

Figure 2:
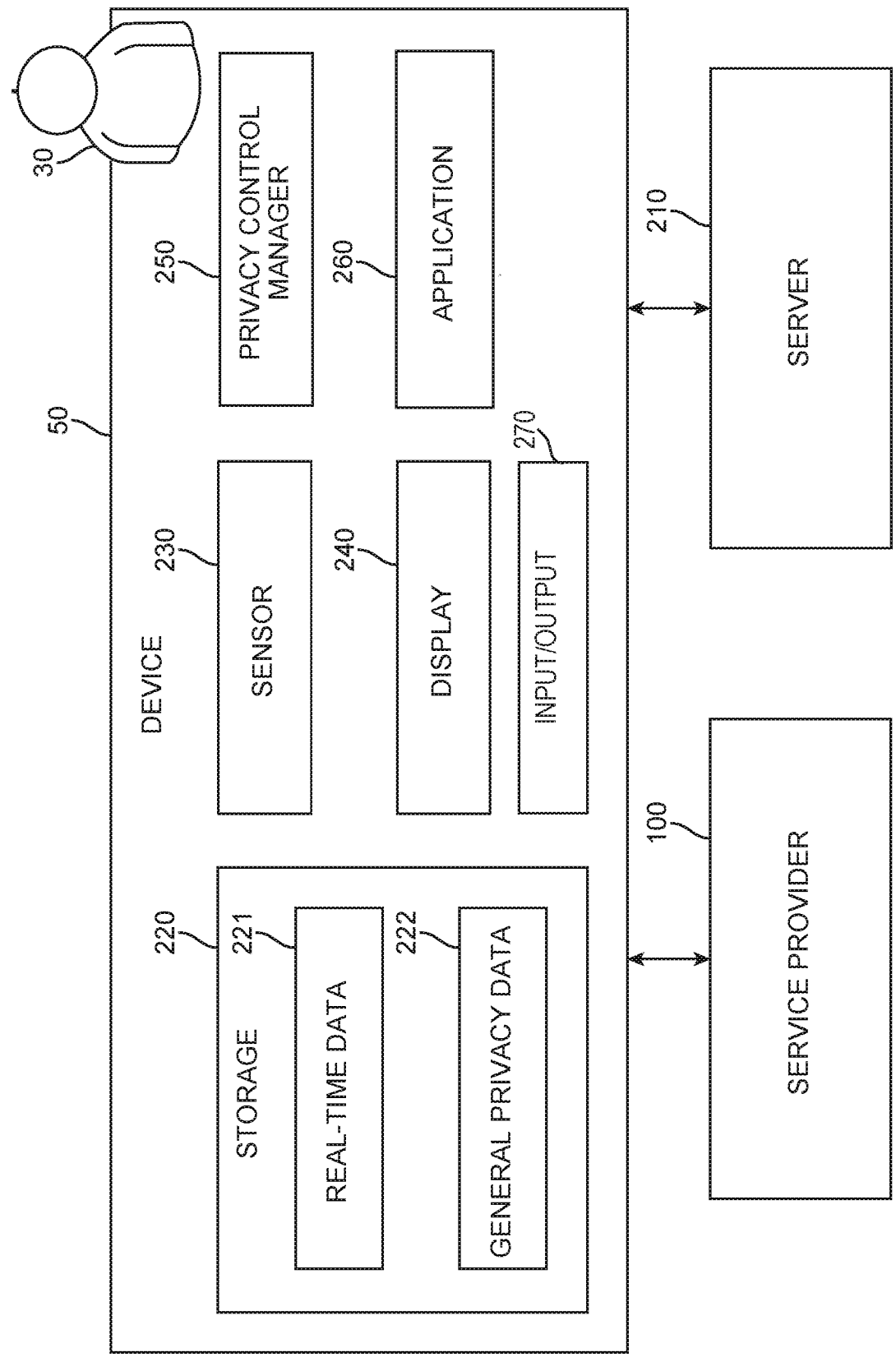
FIG. 2 illustrates an example electronic device including an on-device generic privacy control manager, in one or more embodiments.

FIG. 2 illustrates an example electronic device 50 including an on-device generic privacy control manager 250, in one or more embodiments. The electronic device 50 is configured to exchange data with one or more remote service providers 100 over a connection (e.g., a wireless connection, a wired connection, or a combination of the two).

As described in detail later herein, the privacy control manager 250 is configured to: (1) provide one or more user interfaces that allow a user 30 to provide user input specifying one or more privacy concern levels for one or more types of real-time device sensed data, (2) provide one or more user interfaces that allow a user 30 to provide user input specifying one or more privacy concern levels for general private data, (3) perform one or more automated inference risk assessments to identify one or more privacy risks associated with releasing one or more types of real-time device sensed data to a remote service provider 100, (4) provide one or more user interfaces that notify a user 30 of one or more privacy risks associated with releasing one or more types of real-time device sensed data to a remote service provider 100, and (5) perform one or more data distortions on one or more types of real-time device sensed data requested by a remote service provider 100, where the distorted data is released to the remote service provider 100. The remote service provider 100 can only see the distorted data; general private data cannot be inferred from the distorted data. The privacy control manager 250 is configured to carry out one or all of the above mentioned features.

The remote service provider 100 may not be aware that data it receives from the electronic device 50 is distorted. The remote service provider 100 maintains a model (e.g., a service provider model 353 in FIG. 5) that maps data received from an electronic device 50 to services to provide to the electronic device 50 in return.

The privacy control manager 250 provides a unified framework for protecting data exchanged between the electronic device 50 and a remote service provider. The privacy control manager 250 may be integrated into different types of electronic devices 50, such as a mobile smartphone, an Internet of Things (IoT) device, a smart television, etc. The privacy control manager 250 is compatible with different types of remote service providers 100, and does not require any changes at the remote service provider 100. The privacy control manager 250 is suitable for use with different applications and/or services (e.g., health & fitness applications, social services, travel applications, etc.).

The privacy control manager 250 is configured to protect different types of real-time device sensed data monitored and/or collected by the electronic device 50 (e.g., sensor data collected by IoT devices for healthcare services, location data collected by mobile smartphones for Points of Interest (PoI) recommendations, television/movie data collected by smart televisions for television/movie recommendations and/or advertising services).

The privacy control manager 250 adopts an untrusted server setting where one or more types of real-time device sensed data collected by the electronic device 50 is distorted (i.e., perturbed and/or anonymized) on the electronic device 50 before the data is released to a remote service provider 100. In one embodiment, distorting real-time device sensed data before release may break correlation between the real-time device sensed data and general private data, such that general private data cannot be inferred from the distorted real-time device sensed data.

The privacy control manager 250 provides continuous data privacy protection of general private data based on automated inference risk assessments and data distortions; the risk assessments and the data distortions are updated over time based on changes associated with service providers 100 (e.g., newer services provided, more information requested from service providers 100, etc.) and analysis of distorted data released, quality of services received, etc. The privacy control manager 250 provides a user 30 of the electronic device 50 with increased peace of mind over privacy concern levels.

For example, when a remote service provider 100 requests one or more types of real-time device sensed data from an electronic device 50, the privacy control manager 250 is invoked to identify one or more privacy risks associated with releasing the data requested to the remote service provider 100. The privacy control manager 250 distorts at least a portion of the data requested based on the privacy risks identified, and releases the distorted data to the remote service provider 100. Releasing distorted data protects data privacy; furthermore, the data requested is distorted to an extent that does not compromise quality of services received from the remote service provider 100.

The electronic device 50 further comprises a display 240. In one embodiment, the display 240 comprises an electronic display device 602 (FIG. 11) configured for displaying video, graphics, text, and other data types. The display 240 is configured to display one or more user interfaces provided by the privacy control manager 250.

The electronic client device 50 further comprises one or more input/output (I/O) units 270. In one embodiment, the I/O units 270 comprise at least one user interface devices 606 (FIG. 11), such as a keyboard, a touch screen, a keypad, a pointing device, a mouse, etc. A user 30 may enter/specify input via the I/O units 270.

Figure 4:
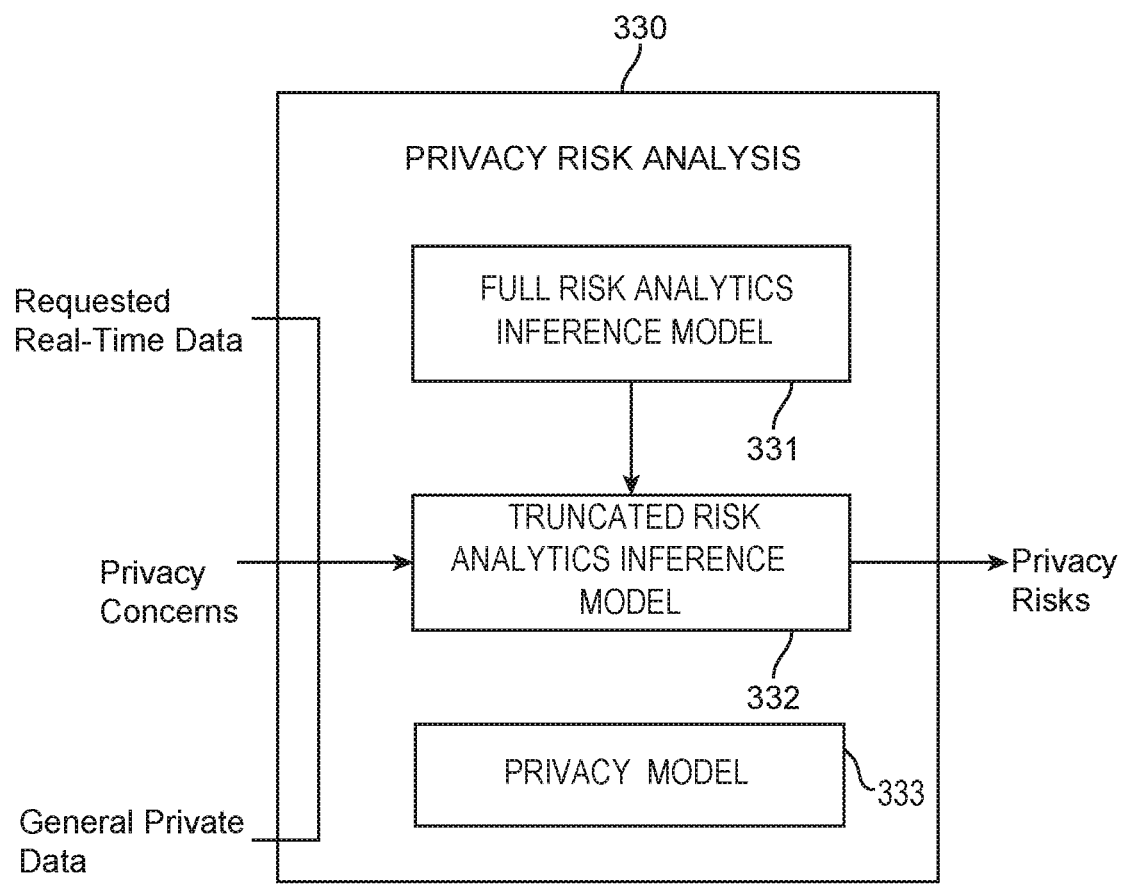
FIG. 4 illustrates an example privacy risk analysis unit in detail, in one or more embodiment.

The electronic client device 50 further comprises one or more storage units 220. In one embodiment, the storage units 220 comprise a storage device 604 (FIG. 11) (e.g., as a hard disk drive) and/or a removable storage device 605 (e.g., removable storage drive, removable memory module, a magnetic tape drive, optical disk drive, computer readable medium having stored therein computer software and/or data). The storage units 220 maintain one or more databases, such as a first database 221 including real-time device sensed data collected by the electronic client device 50, and a second database 222 including general private data. As described in detail later herein, the storage units 220 further maintain a full risk analytics inference model 331 (FIG. 4) and an inference model 332 (FIG. 4).

In one embodiment, the general private data maintained on the database 222 is obtained via one or more types of user input, such as audio input, textual input, gesture input, user selection from a dropdown list, freeform input, etc. In one embodiment, the general private data is learnt offline based on publicly available data (e.g., a published study or survey, etc.). In another embodiment, the general private data is learnt on-device based on an inference model (e.g., the inference model 332 in FIG. 4) and/or usage of the electronic device 50, in particular inputs and outputs. In yet another embodiment, the general private data is obtained from system default information relating to the electronic device 50. The system default information relating to the electronic device 50 may include one or more device characteristics of the device 50, such as a media access control address (MAC address) of the device 50. In one embodiment, the electronic device 50 maintains a privacy model 333 (FIG. 4) associated with the general private data.

In one embodiment, one or more applications 260 reside on the electronic device 50. Each application 260 is associated with a particular remote service provider 100; the application 260 may be invoked to request one or more services offered by the remote service provider 100.

The electronic device 50 further comprises one or more sensors 230. Each sensor 230 is configured to monitor and collect a particular type of real-time device sensed data. Each sensor 230 is either a hardware sensor or a software sensor. Examples of hardware sensors include an inertial sensor, a magnetic sensor, a barometer, a WiFi sensor, a Bluetooth sensor, a GPS, a microphone, etc. Examples of software sensors include software applications configured for one or more of the following: log search history of online searches performed via the electronic device 50, log usage of other software applications residing on the electronic device 50 (e.g., shopping applications, mobile payment applications, etc.), log browser history of a browser utilized on the electronic device 50, etc.

For example, if the electronic device 50 is an IoT device, the real-time device sensed data comprises sensor data (e.g., data identifying contextual information, such as temperature, etc.). As another example, if the electronic device 50 is a mobile smartphone, the real-time device sensed data comprises location data (e.g., data identifying one or more location traces of the mobile smartphone). As yet another example, if the electronic device 50 is a smart television, the real-time device sensed data comprises television/movie data (e.g., data identifying one or more television programs/movies viewed on the smart television).

As described in detail later herein, the electronic device 50 is further configured to receive a new or updated risk analytics inference model from a server 210; the risk analytics inference model is used to identify one or more privacy risks associated with releasing one or more types of real-time device sensed data to a remote service provider 100.

The privacy control manager 250 eases user burden on managing data privacy, and enables seamless information sharing between the electronic device 50 and a remote service provider 100 without compromising both data privacy and quality of services received from the remote service provider 100.

Figure 3A:
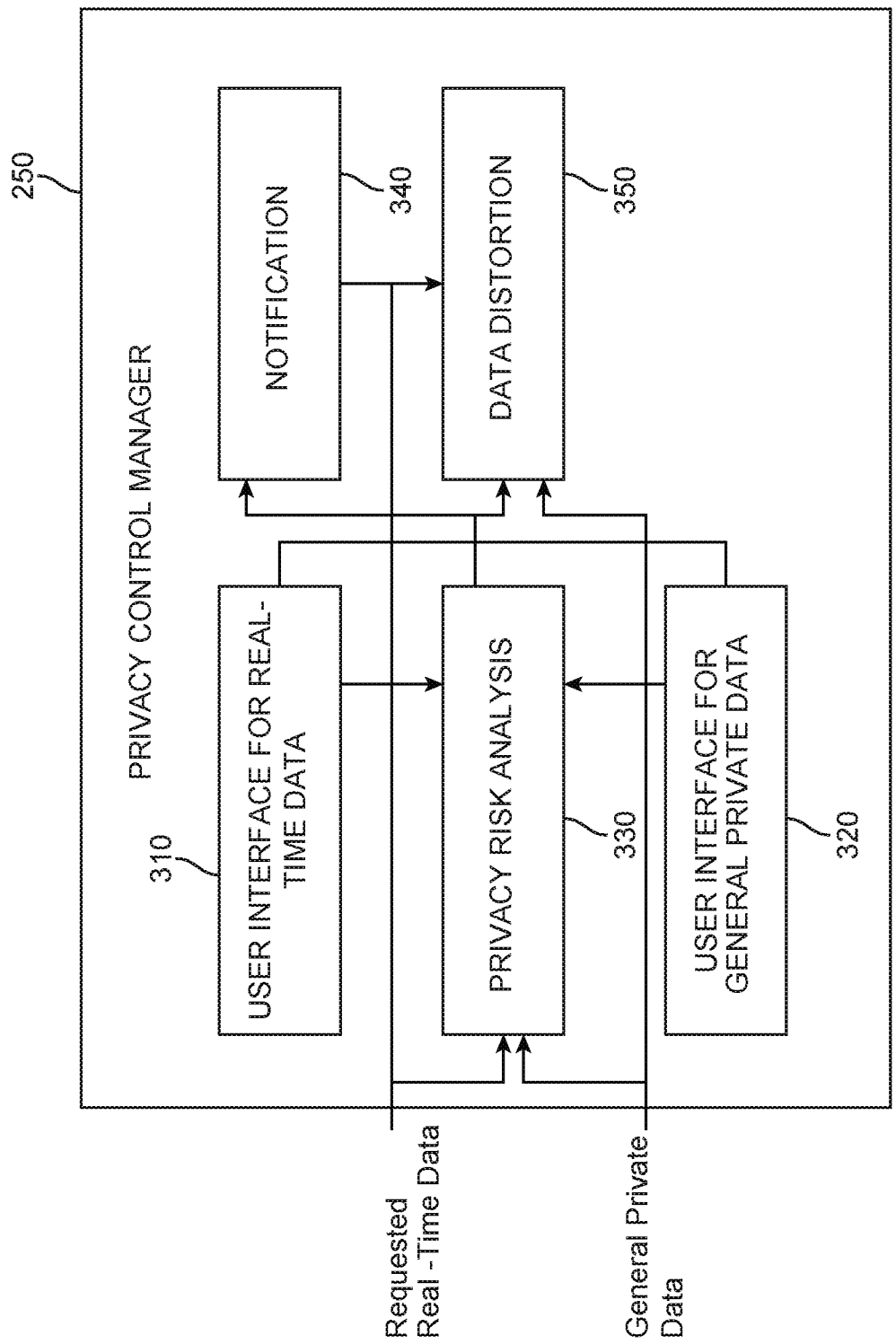
FIG. 3A illustrates an example privacy control manager in detail, in one or more embodiments.

FIG. 3A illustrates an example privacy control manager 250 in detail, in one or more embodiments. The privacy control manager 250 comprises a first user interface unit 320. The first user interface unit 320 is a software component configured to generate at least one user interface that allows a user 30 to provide user input specifying one or more privacy concern levels for general private data.

The privacy control manager 250 further comprises a second user interface unit 310 configured to determine one or more types of real-time device sensed data requested by a service provider 100 based on information relating to the remote service provider 100. For example, the information relating to the remote service provider 100 may be obtained from a service provider description that is downloaded from the remote service provider 100. The service provider description identifies real-time device sensed data that may be requested by the remote service provider 100 to provide a personalized service. As another example, the information relating to the remote service provider 100 may be obtained from a code analysis of application code for an application 260 associated with the remote service provider 100. For example, if the application 260 is a health application, code analysis of application code for the health application may identify one or more data accesses to obtain real-time device sensed data, such as BMI, etc. The second user interface unit 310 is further configured to generate at least one user interface that identifies each type of real-time device sensed data requested, and allows the user 30 to provide user input specifying, for each type of real-time device sensed data requested, a corresponding privacy concern level.

The privacy control manager 250 further comprises a privacy risk analysis unit 330 configured to perform one or more automated inference risk assessments to identify one or more privacy risks associated with releasing the data requested to the remote service provider 100. The risk assessments are based on the following: the privacy concern levels for the general private data, each privacy concern level for each type of real-time device sensed data requested, the general private data, and each type of real-time device sensed data requested.

The privacy control manager 250 further comprises a notification unit 340 configured to determine whether the privacy risks identified exceed a pre-determined threshold. In response to determining the privacy risks identified exceed the pre-determined threshold, the notification unit 340 is further configured to generate a notification that notifies the user 30 of the privacy risks identified. The notification further prompts the user 30 to select one of two options: (1) release the data requested to the remote service provider 100 without distorting the data requested, or (2) apply one or more data distortions to the data requested, and release the distorted data to the remote service provider 100. If the pre-determined threshold is not exceeded, the data requested may be released to the service provider 100 without data distortions.

The notification unit 340 is also configured to generate a notification that notifies the user 30 of one or more changes, such as changes in privacy risks when more data is released, new or updated services provided by service providers 100 (e.g., more data is requested by the service providers 100), new or updated applications 260 associated with service providers 100, etc.

The privacy control manager 250 further comprises a data distortion unit 350. If the user 30 opts to apply one or more data distortions to the data requested, the data distortion unit 350 is invoked to perform the data distortions on data requested. The distorted data is then released to the remote service provider 100. The data distortions are based on the following: the privacy risks identified, the general private data, and each type of real-time device sensed data requested. The data distortion unit 350 is configured to distort the data requested, such that the general private data cannot be inferred from the distorted data.

Figures 3B, 3C:
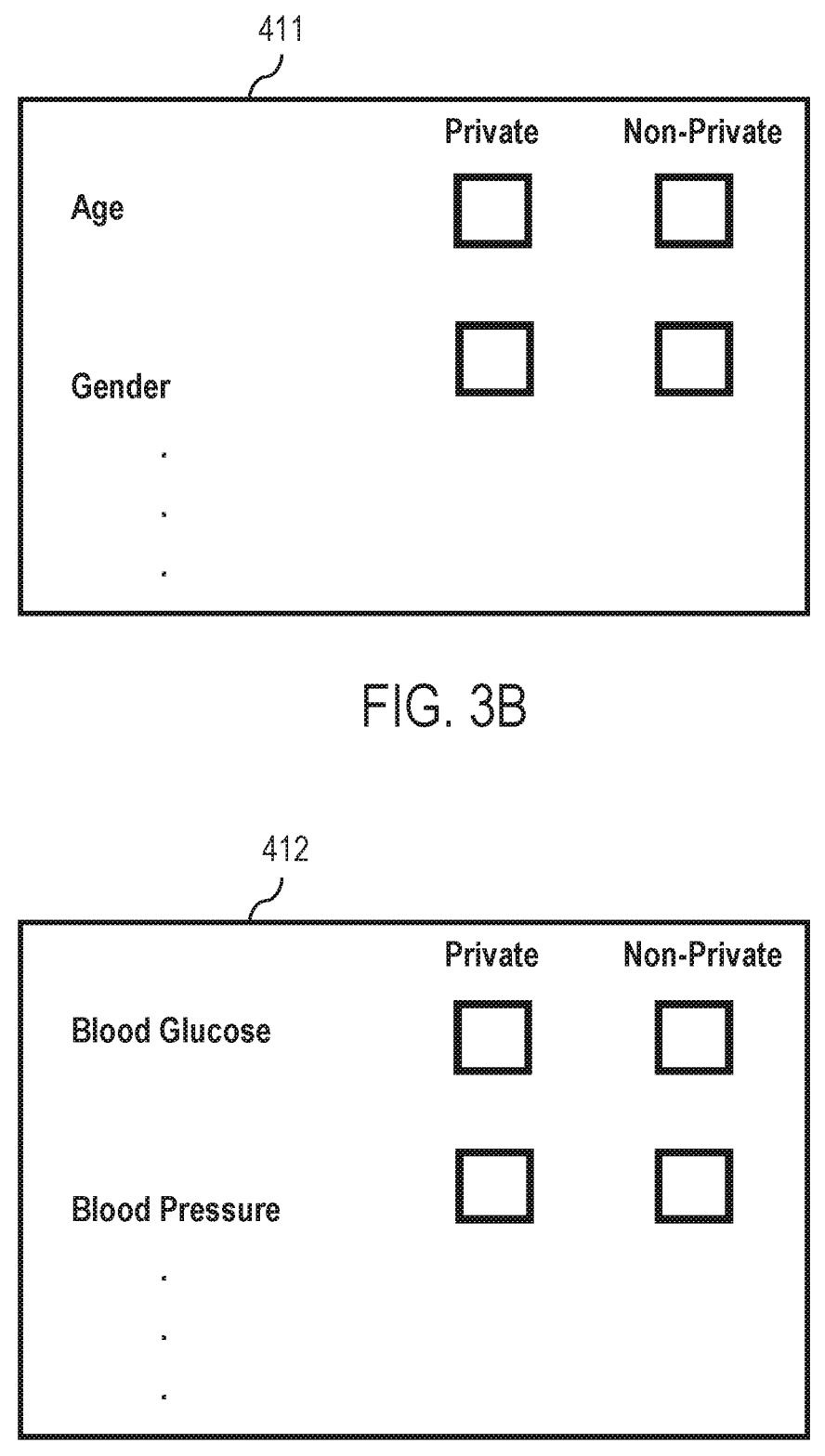

FIG. 3B illustrates an example user interface 411 generated by the first user interface unit 320, in one or more embodiments. The user interface 411 allows a user 30 to provide user input specifying one or more privacy concern levels for one or more types of general private data, such as age, gender, etc. For example, as shown in FIG. 3B, for each type of general private data, the user 30 may specify a corresponding privacy concern level by selecting either a "Private" checkbox or a "Non-Private" checkbox. The invention is not limited to the user interface 411 shown in FIG. 3B; other types of user interfaces may be generated by the first user interface unit 320.

FIG. 3C illustrates an example user interface 412 generated by the second user interface unit 310, in one or more embodiments. The user interface 412 allows a user 30 to provide user input specifying one or more privacy concern levels for one or more types of real-time device sensed data requested by an application 260, such as blood glucose levels, blood pressure, etc. For example, as shown in FIG. 3C, for each type of real-time device sensed data requested, the user 30 may specify a corresponding privacy concern level by selecting either a "Private" checkbox or a "Non-Private" checkbox. The invention is not limited to the user interface 412 shown in FIG. 3C; other types of user interfaces may be generated by the second user interface unit 310.

FIG. 4 illustrates an example privacy risk analysis unit 330 in detail, in one or more embodiments. The privacy risk analysis unit 330 is configured to assess privacy risks of inferring general private data from real-time device sensed data released to a remote service provider 100.

In this specification, the term "noisy data" as used herein represents meaningless data that cannot be understood and interpreted correctly by machines, such as unstructured text.

The privacy risk analysis unit 330 comprises a full risk analytics inference model 331. The full risk analytics inference model 331 is learnt offline based on data from multiple users 30; the data from the multiple users 30 may include noisy data samples that the full risk analytics inference model 331 is trained to ignore.

In one embodiment, the electronic device 50 is pre-loaded with the full risk analytics inference model 331. In another embodiment, the full risk analytics inference model 331 is periodically loaded onto the electronic device 50 by downloading a latest version of the full risk analytics inference model 331 from a remote server 210. The full risk analytics inference model 331 may be periodically trained offline on the remote server 210 based on up-to-date data received from multiple users 30.

The privacy risk analysis unit 330 further comprises a truncated risk analytics inference model 332. The truncated risk analytics inference model 332 represents a reduced version of the full risk analytics inference model 331. The privacy risk analysis unit 330 performs risks assessments based on the truncated risk analytics inference model 332.

In one embodiment, the extent to which on-device reduction is applied to the full risk analytics inference model 331 to obtain the truncated risk analytics inference model 332 is based on privacy concern levels for general private data.

In this specification, the term "category of applications" as used herein represents one or more applications 260, wherein the one or more applications 260 are related (e.g., one or more health-related applications 260).

In another embodiment, each category of applications has a corresponding truncated risk analytics inference model 332. The corresponding truncated risk analytics inference model 332 is specific to privacy concern levels for each type of real-time device sensed data requested by the category of applications. Specifically, the extent to which on-device reduction is applied to the full risk analytics inference model 331 to obtain the corresponding truncated risk analytics inference model 332 is based on privacy concern levels specified for each type of real-time device sensed data requested by the category of applications.

For example, if the category of related applications 260 includes one or more health-related applications requesting real-time device sensed data such as heart rate, blood pressure and blood glucose levels, the corresponding truncated risk analytics inference model 332 is based on privacy concern levels specified for the real-time device sensed data requested.

A truncated risk analytics inference model 332 is updated with a new truncated risk analytics inference model 332 when at least one privacy concern level changes (e.g., a change in response to new permissions requested by an application 260). In one embodiment, the full risk analytics inference model 331 is maintained on the electronic device 50, and on-device reduction is applied to the full risk analytics inference model 331 maintained to obtain a new truncated risk analytics inference model 332 that accounts for the at least one privacy concern level changed. In another embodiment, a latest version of the full risk analytics inference model 331 is downloaded to the electronic device 50 from a remote server 210, and on-device reduction is applied to the full risk analytics inference model 331 downloaded to obtain a new truncated risk analytics inference model 332 that accounts for the at least one privacy concern level changed.

The privacy risk analysis unit 330 further comprises a privacy model 333. The a privacy model 333 represents general private data that is learnt offline based on publicly available data (e.g., a published study or survey, etc.), learnt on-device based on the truncated risk analytics inference model 332 and/or usage of the electronic device 50 (e.g., inputs and outputs), or obtained from system default information relating to the electronic device 50.

Figure 5:
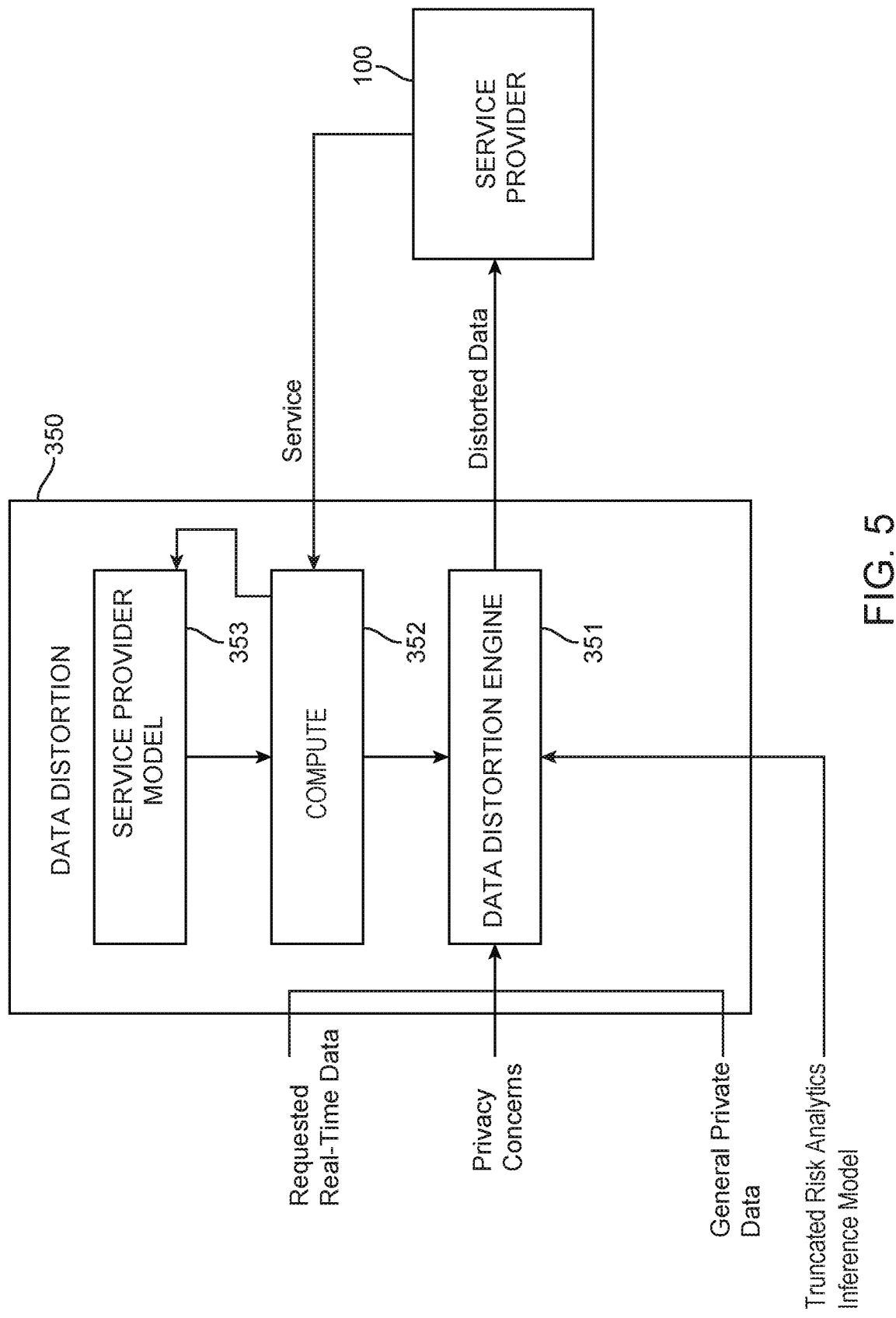
FIG. 5 illustrates an example data distortion unit in detail, in one or more embodiments.

FIG. 5 illustrates an example data distortion unit 350 in detail, in one or more embodiments. The data distortion unit 350 comprises a data distortion engine 351 configured to receive, as input, each of the following: (1) each type of real-time device sensed data requested by a service provider 100, (2) general private data, (3) privacy concern levels for the data requested, (4) privacy concern levels for the general private data, (5) a truncated risk analytics inference model 332 specific to the remote service provider 100, and (6) a service provider model 353 representing correlations between data previously released to the remote service provider 100 and services received in return from the remote service provider 100. The data distortion engine 351 is further configured to apply one or more data distortions to the data requested based on the inputs received.

In one embodiment, the service provider model 353 is loaded onto the electronic device 50 by downloading the service provider model 353 from the remote service provider 100.

In another embodiment, the service provider model 353 is learnt at the electronic device 50. Specifically, the data distortion unit 350 further comprises a compute unit 352 configured to compute and update the service provider model 353 each time data is released to the remote service provider 100 in exchange for services from the remote service provider 100. The quality of services received from the remote service provider 100 may be determined based on user input (e.g., the user 30 is prompted to provide a rating, score or other input type relating to the quality of services received). Over time, the service provider model 353 adapts with continuous release of data in exchange for services. The quality of services received from the remote service provider 100 will improve over time as the service provider model 353 becomes established with training based on history of data releases and services received. For example, the data distortion engine 351 may determine a maximum degree of data distortion that does not compromise quality of service provided by the remote service provider 100 based on the service provider model 353, and distort at least a portion of the data requested in accordance with the maximum degree of data distortion determined.

In one embodiment, an existing model approach may be used to update the service provider model 353, such as Maximum A Posteriori (MAP) parameter learning for a conditional random field (CRF) model. Specifically, a prior CRF model may be set as the service provider model 353, and one or more model parameters for the CRF model are updated using maximum likelihood based on new data.

Figure 6:
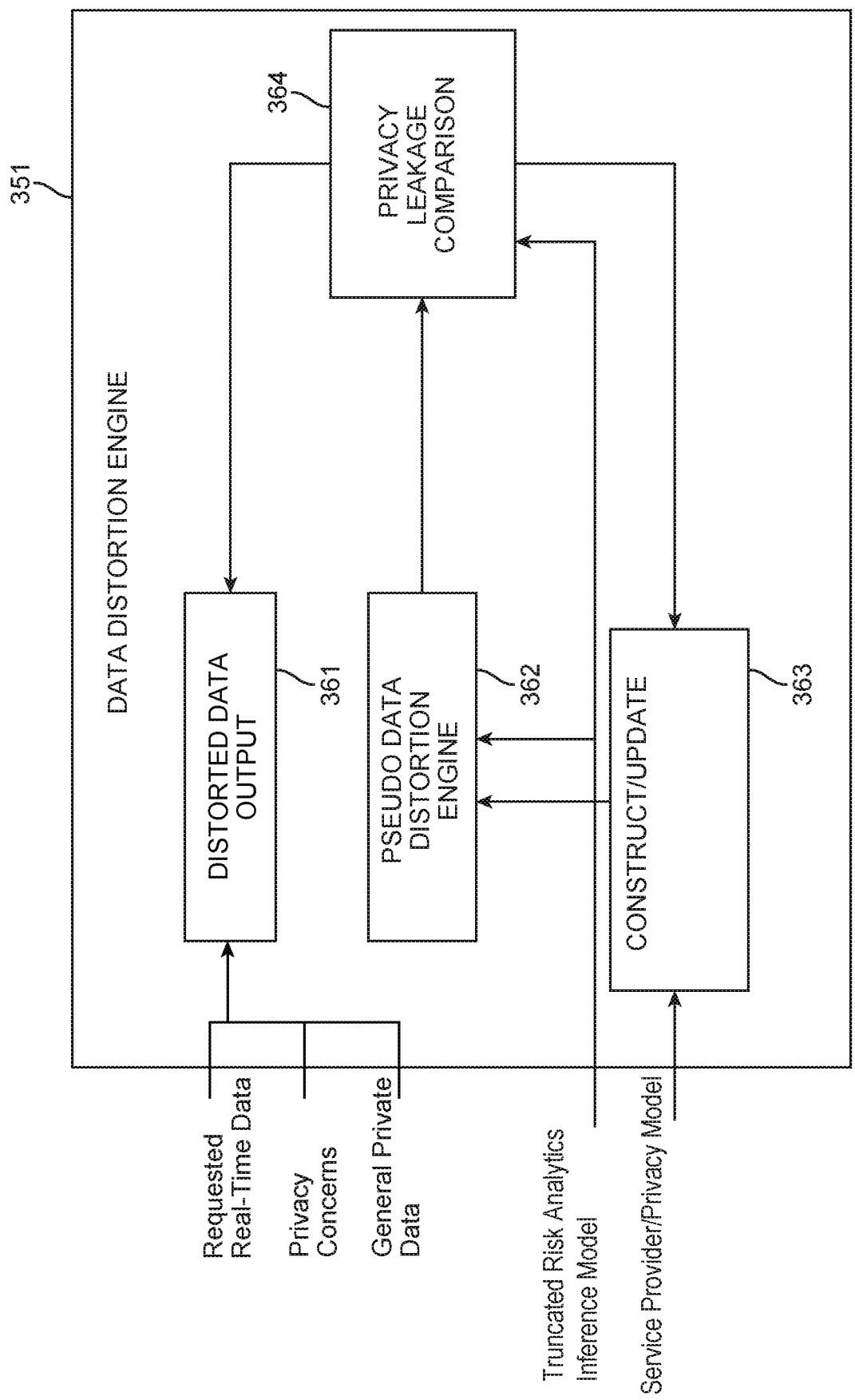
FIG. 6 illustrates an example data distortion engine in detail, in one or more embodiments.

FIG. 6 illustrates an example data distortion engine 351 in detail, in one or more embodiments. As described in detail later herein, the data distortion engine 351 comprises a construct/update unit 363 configured to construct a linearized model. In one embodiment, the construct/update unit 363 constructs a linearized model based on the service provider model 353. In another embodiment, the construct/update unit 363 constructs a linearized model based on the privacy model 333.

The data distortion engine 351 further comprises a pseudo data distortion engine 362 and a privacy leakage comparison unit 364. The pseudo data distortion engine 362 is configured to iteratively generate pseudo distorted data based on a truncated risk analytics inference model 332 and a linearized model constructed by the construct/update unit 363.

The privacy leakage comparison unit 364 is configured to determine whether pseudo distorted data generated in a current iteration leaks less data privacy compared to pseudo distorted data generated in a prior iteration. If the privacy leakage comparison unit 364 determines that data privacy leakage cannot be reduced, the pseudo distorted data generated in the current iteration is provided to the output unit 361 for release to the remote service provider 100 as distorted data. If the privacy leakage comparison unit 364 determines that data privacy leakage can be reduced, the linearized model is updated via the construct/update unit 363, and the pseudo data distortion engine 362 is triggered to generate new pseudo distorted data based on the on the truncated risk analytics inference model 332 and the updated linearized model.

An example data distortion algorithm implemented by the data distortion engine 351 is described next using the notations provided in Table 1 below.

In this specification, the term "information gain" as used herein represents a reduction in uncertainty over utility Y given a set of non-private features $F^s$ released to the remoter service provider 100.

In this specification, the term "privacy notion" as used herein represents a measure of data privacy leakage (via information gain) of a privacy domain Π of the electronic device 50 after the electronic device 50 releases a set of non-private features $F^s$ to the remote service provider 100.

To quantify predictability, privacy may be defined a conditional entropy of the a privacy domain Π given a set of non-private features $F^s$ released to the remote service provider 100. A conditional entropy may be represented in accordance with equation (1) provided below:

$$H(\Pi | F^s) = - \sum_{P_i \in \Pi, F_i \in \Phi^s} Pr(P_i, F_i) \log Pr(P_i | F_i). \quad (1)$$

TABLE 1

| Notation | Description |
|---|---|
| f | A set of n features $\{f_1, \ldots, f_n\}$. Each feature $f_i$ may be a type of real-time device sensed data (e.g., gyroscope data) or a feature extracted from the type of real-time device sensed data (e.g., statistical features). |
| Δ | An input data domain |
| F | A set of discrete random variables $[F_1, \ldots, F_n]$ representing a feature domain derived from the entire input data domain Δ and associated with n-dimensional features |
| X | A random variable |
| Ω (X) | Sample space of a random variable X |
| d | An input data, wherein d ∈ Δ. For each input data d, the electronic device 50 maintains an n-dimensional feature vector $(d_1, \ldots, d_n)$ representing the input data d, wherein $d_i \in \Omega(F_i)$. |
| $d^s$ | A n-dimensional non-private feature vector corresponding to an input data d. To preserve privacy, the remote service provider 100 maintains, for each input data d, a corresponding n-dimensional non-private feature vector $d^s$ represented as $(d_1^s, \ldots, d_n^s)$, wherein $d_i^s = d_i$ if the electronic device 50 releases feature i to the remote service provider 100, and $d_i^s$ is unknown otherwise. |
| $f^s$ | A set of non-private features the electronic device 50 releases to the remote serivice provider 100, wherein $f^s = \{i \mid d_i \neq ?\} \subseteq f$ |
| $F^s$ | A set of discrete random variables with respect to $f^s$. In this specification, $f^s$ and $F^s$ may be used interchangeably. |
| $f^p$ | A set of privacy-sensitive features that the electronic device 50 has not released to the remote serivice provider 100, wherein $f^p = f \backslash f^s$ |
| Π | A set of discrete random variables representing a privacy domain of the electronic device 50, wherein $\Pi = \{P_1, \ldots, P_l\}$, and each random variable $P_i$ represents a type of private information (e.g., age, gender, etc). Π = F if the electronic device 50 is configured to protect original data features. |
| Y | Utility |
| P ($F^s$) | Privacy notion |
| U ($F^s$) | Utility notion |
| U (Y, $F^s$) | Information gain |
| Σ | Classifier algorithm |
| C | A set of classes $\{c_1, \ldots, c_m\}$ |
| θ | Threshold θ with regards to.user-specified privacy concern levels (i.e., privacy requirement) |

A privacy notion $P(F^s)$ may be represented in accordance with equation (2) provided below:

$$P(F^s) \cong H(\Pi) - H(\Pi|F^s) \qquad (2),$$

wherein uncertainty loss over a privacy domain $\Pi$ given a set of non-private features $F^s$ released to the remote service provider 100 is measured. As $H(\Pi)$ is a constant with respect to different sets of released features $F^s$, optimal solutions of $P(F^s)$ and $H(\Pi|F^s)$ are the same, i.e., $OPT(P(F^s))=OPT(H(\Pi|F^s))$.

Assume a user 30 of the electronic device 50 has specified privacy concern levels requiring $P(F^s)<\theta$.

In one embodiment, equation (2) provided above represents a threshold that the data distortion engine 351 uses to break correlation between real-time device sensed data and general private data, such that the general private data cannot be inferred from distorted real-time device sensed data.

In this specification, the term "utility notion" as used herein represents a measure of quality of services returned by the remote service provider 100 after the electronic device 50 releases a set of non-private features $F^s$ to the remote service provider 100 (i.e., measure of utility of the set of non-private features $F^s$ released).

Information gain $U(Y, F^s)$ may be represented in accordance with equation (3) provided below:

$$U(Y,F^s) \cong IG(Y;F^s) = H(Y) - H(Y|F^s) \qquad (3).$$

The remote service provider 100 applies the classifier algorithm $\Sigma$ to map each input data d to a class in C. The classifier algorithm $\Sigma$ may be represented in accordance with equation (4) provided below:

$$\Sigma: D \rightarrow C \qquad (4).$$

The data distortion algorithm implemented by the data distortion engine 351 satisfies at least the following objectives: (1) the electronic device 50 preserves its privacy domain $\Pi$ maximally by disclosing/releasing a minimal amount of information to the remote service provider 100, and (2) the remote service provider 100 learns a certain prediction or service for each input data received from the electronic device 50, wherein the prediction or service is a function S determined by the remote service provider 100.

In one embodiment, the data distortion engine 351 selects a set of non-private features $F^s$ to release to the remote service provider 100 by maximizing the privacy notion $P(F^s)$ subject to the utility notion $U(F^s)$.

In another embodiment, the data distortion engine 351 selects a set of non-private features $F^s$ to release to the remote service provider 100 by maximizing the utility notion $U(F^s)$ subject to the privacy notion $P(F^s)$, as represented by equation (5) provided below:

maximize $U(Y,F^s)$ subject to $P(\Pi,F^s) \leq \theta \qquad (4).$

In this specification, notations $P(\Pi,F^s)$ and $P(F^s)$ are used interchangeably for simplicity as each output is only related to the set of non-private features $F^s$ released to the remote service provider 100. Notations $U(Y,F^s)$ and $U(F^s)$ are also used interchangeably for simplicity as each output is only related to the set of non-private features $F^s$ released to the remote service provider 100.

In one embodiment, the data distortion algorithm implemented by the data distortion engine 351 is an embedded iterative algorithm (EIA). Table 2 below provides an example pseudo-code for the EIA implemented by the data distortion engine 351.

TABLE 2

Input: feature domain F, privacy requirement $\theta$
Output: distored data comprising a set of non-private features $F^s$
// Outer Iterations
1.    $F_0^s(0) \leftarrow \emptyset$
2.    $T \leftarrow 1$
3.    do
       // Inner Iterations
4.    $F_T^s(t) \leftarrow \emptyset$
5.    while $Q_{F_{T-1}(t)}^s(F_T^s(t)) \leq \theta$ do
6.    Select a feature $f$ maximize U; $F_T^s \leftarrow F_T^s \cup \{f\}$;
7.    end
8.    $T \leftarrow T + 1$;
9.    while Convergence;
10.  return $F^s \leftarrow F_T^s$ As shown in Table 2, one set of iterations ("inner iterations") is embedded within another set of iterations ("outer iterations"), wherein the inner iterations and the outer iterations are represented by lines 4-7 and lines 1-9, respectively. As line 1 in Table 2 shows, a set of non-private features FS to release to the remote service provider 100 is initially set to $\emptyset$.

In each outer iteration, the privacy notion $P(F^s)$ is replaced with a simpler objective function $$Q_{F_{T-1}^s}(F_T^s)$$

that is based on a set of non-private features $F_{T-1}^s$ selected in a prior outer iteration t–1. The simpler objective function $$Q_{F_{T-1}^s}(F_T^s)$$

may be represented in accordance with equation (5) provided below:

$$Q_{F_{T-1}^s}(F_T^s) \cong P(F_{T-1}^s) - \sum_{F_i \in F_{T-1}^s \setminus F_T^s} [P(F) - P(F \setminus \{F_i\})] + \sum_{F_i \in F_T^s \setminus F_{T-1}^s} [P(F_{T-1}^s \cup \{F_i\}) - P(F_{T-1}^s)]. \qquad (5)$$

In one embodiment, the construct/update unit 363 constructs a linearized model in accordance with equation (5) provided above. If the privacy notion $P(F^s)$ is maximized subject to the utility notion $U(F^s)$, the construct/update unit 363 constructs a linearized privacy model based on the privacy model 333. If the utility notion $U(F^s)$ is maximized instead subject to the privacy notion $P(F^s)$, the construct/update unit 363 constructs a linearized service provider model based on the service provider model 353.

The simpler objective function $$Q_{F_{T-1}^s}(F_T^s)$$

may be linear, thereby reducing complexity of solving equation (5) provided above. Each outer iteration aims to solve equation (6) provided below:

$$\text{maximize } U(F^s) \quad (6)$$
$$\text{subject to } Q_{F_{T-1}^s}(F^s) \leq \theta.$$

As the simpler objective function $$Q_{F_{T-1}^s}(F^s)$$

is modular, greedy algorithm is applied in each inner iteration to iteratively select from a set of non-private features $F_T^s$ to release to the remote service provider 100. Specifically, in each inner iteration, a feature f that maximizes utility U is selected for inclusion into the set of non-private features until $$Q_{F_{T-1}^s}(F^s) > \theta.$$

When $$Q_{F_{T-1}^s}(F^s) > \theta,$$

the set of selected non-private features $F_T^s$ is release to the remote service provider 100. The set of selected non-private features $F_T^s$ released is distorted data.

In one embodiment, the privacy leakage comparison unit 364 determines whether pseudo distorted data generated in a current iteration leaks less data privacy compared to pseudo distorted data generated in a prior iteration using the condition specified in line 5 in Table 2. If the privacy leakage comparison unit 364 determines that data privacy leakage cannot be reduced (i.e., the condition is no longer satisfied), the pseudo distorted data generated in the current iteration is provided to the output unit 361 for release to the remote service provider 100 as distorted data. If the privacy leakage comparison unit 364 determines that data privacy leakage can be reduced (i.e., the condition is still satisfied), the linearized service provider model is updated via the construct/update unit 363, and the pseudo data distortion engine 362 is triggered to generate new pseudo distorted data based on the on the truncated risk analytics inference model 332 and the updated linearized service provider model.

Figure 7:
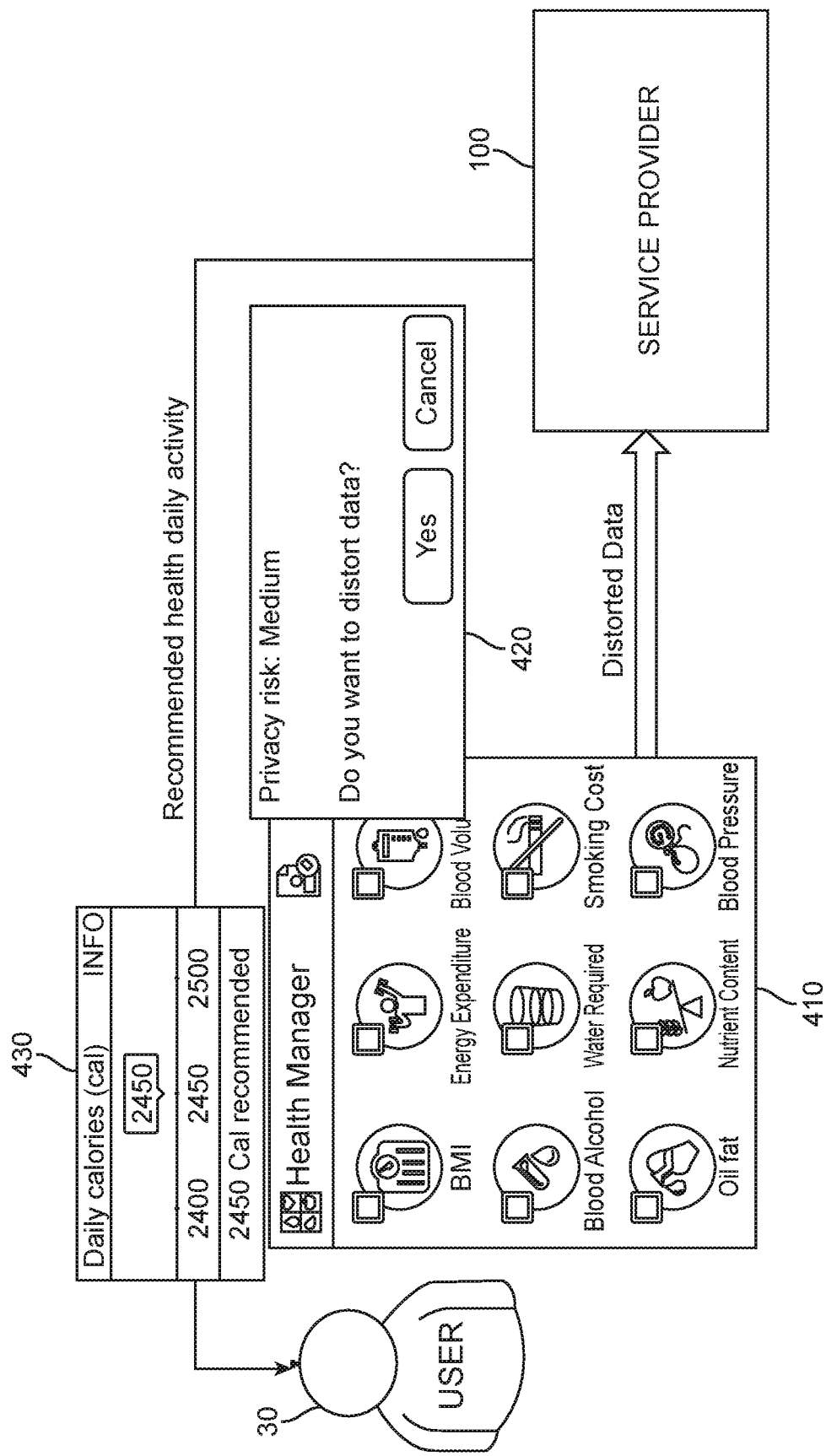
FIG. 7 illustrates a first example user interface generated by the privacy control manager, in one or more embodiments.

FIG. 7 illustrates a first example user interface 410 generated by the privacy control manager 250, in one or more embodiments. When a user 30 launches and starts using an application 260 related to healthcare management on his/her electronic device 50 (e.g., IoT device), the privacy control manager 250 generates the user interface 410 listing each type of real-time device sensed data requested by a service provider 100 associated with the application 260. The data requested may include information that the user 30 considers non-private, such as "oil fat", "water required", etc. The data requested, however, may also include information that the user 30 considers private and from which general private data (e.g., age, whether the user 30 has diabetes, etc.) may be inferred, such as "blood pressure", etc.

For each type of real-time device sensed data requested, the user 30 can specify a corresponding privacy concern level via another user interface generated by the privacy control manager 250 (e.g., user interface 412 in FIG. 3C). In one embodiment, the application 260 has a corresponding truncated risk analytics inference model 332. The extent to which on-device reduction is applied to the full risk analytics inference model 331 to obtain the corresponding truncated risk analytics inference model 332 is based on the privacy concern levels specified.

The privacy control manager 250 performs risk assessments on the data requested using the corresponding truncated risk analytics inference model 332, and generates a notification 420 indicating an inference risk level based on the risk assessments. For example, as shown in FIG. 7, the inference risk level may be "Medium". In one embodiment, the notification 420 may also identify one or more types of general private data that may be inferred from the real-time device sensed data requested by the remote service provider 100 (e.g., if the remote service provider 100 requests blood glucose levels, the user 30 is notified that the remote service provider 100 may infer whether the user 30 has diabetes from the requested data). The privacy control manager 250 determines which types of general private data may be inferred from the real-time device sensed data requested based on the corresponding truncated risk analytics inference model 332.

If the user 30 opts to distort the data requested before release, the privacy control manager 250 performs data distortions on the data requested, and releases the distorted data to the remote service provider 100. The application 260 receives, in return, a service 430 from the remote service provider 100, where the service 430 received comprises recommended health daily activity 430 (e.g., suggested daily calories) based on the distorted data released.

Figure 8:
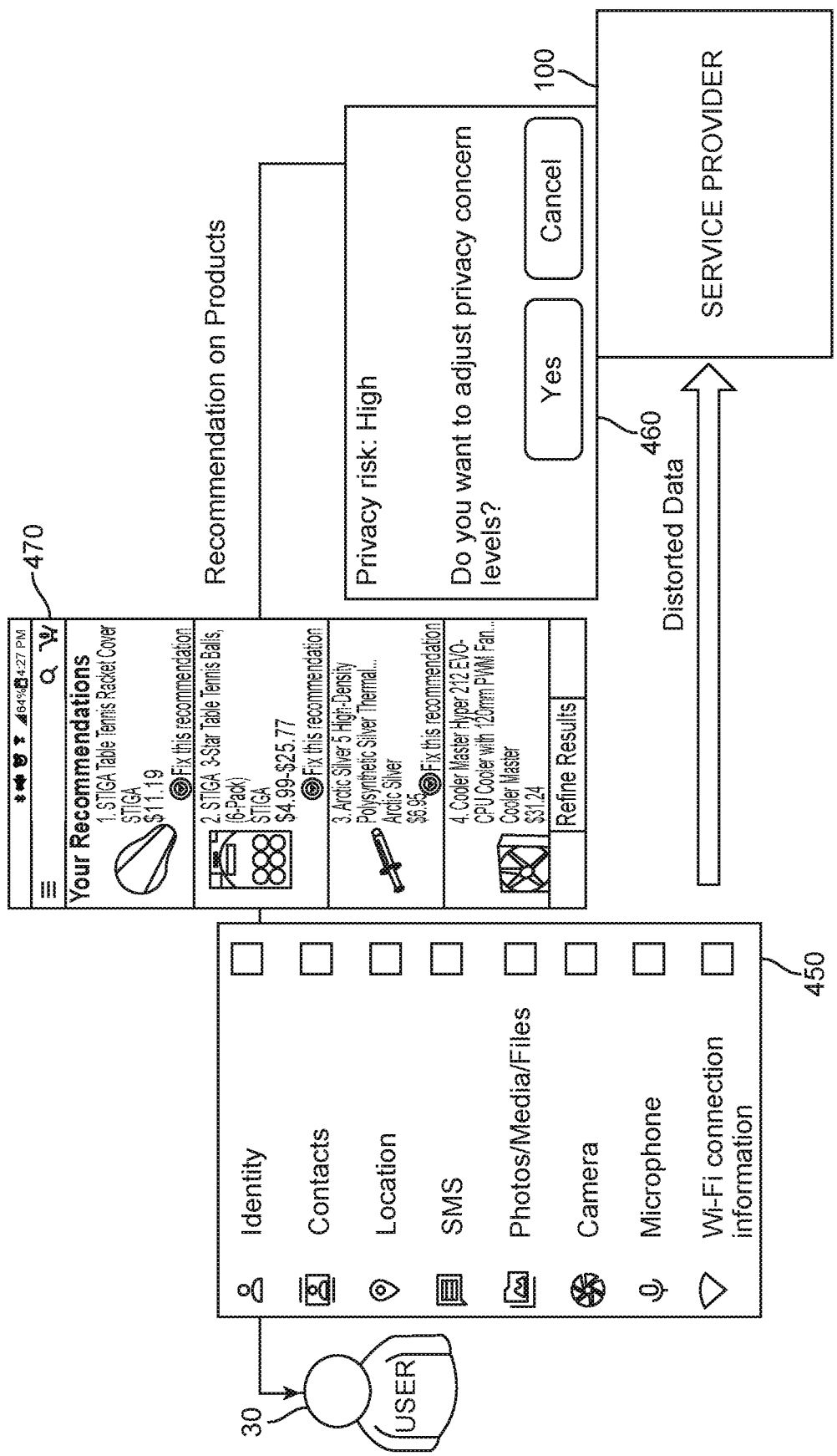
FIG. 8 illustrates a second example user interface generated by the privacy control manager, in one or more embodiments.

FIG. 8 illustrates a second example user interface 450 generated by the privacy control manager 250, in one or more embodiments. When a user 30 launches and starts using an application 260 related to shopping on his/her electronic client device 50 (e.g., mobile smartphone), the privacy control manager 250 generates the user interface 450 listing each type of real-time device sensed data requested by a service provider 100 associated with the application 260. The data requested may include information that the user 30 considers non-private, such as "location", etc. The data requested, however, may also include information that the user 30 considers private and from which general private data (e.g., age, ethnicity, etc.) may be inferred, such as real-time device sensed data collected by a camera of the electronic device 50, photos, etc. For each type of real-time device sensed data requested, the user 30 can specify a corresponding privacy concern level via another user interface generated by the privacy control manager 250 (e.g., similar to user interface 412 in FIG. 3C).

In one embodiment, the application 260 has a corresponding truncated risk analytics inference model 332. The extent to which on-device reduction is applied to the full risk analytics inference model 331 to obtain the corresponding truncated risk analytics inference model 332 is based on the privacy concern levels specified.

The privacy control manager 250 performs risk assessments on the data requested using the corresponding truncated risk analytics inference model 332, and generates a notification 460 indicating an inference risk level based on the risk assessments. For example, as shown in FIG. 8, the inference risk level may be "High". In one embodiment, the notification 460 may also identify one or more types of general private data that may be inferred from the real-time device sensed data requested by the remote service provider 100 (e.g., if the remote service provider 100 requests real-time device sensed data collected by a camera of the electronic device 50, the user 30 is notified that the remote service provider 100 may infer an ethnicity of the user 30 from the requested data). The privacy control manager 250 determines which types of general private data may be inferred from the real-time device sensed data requested based on the corresponding truncated risk analytics inference model 332.

If the user 30 opts to distort the data requested before release, the privacy control manager 250 performs data distortions on the data requested, and releases the distorted data to the remote service provider 100. The application 260 receives, in return, a service 470 from the remote service provider 100, where the service 470 received comprises product recommendations based on the distorted data released.

Figure 9:
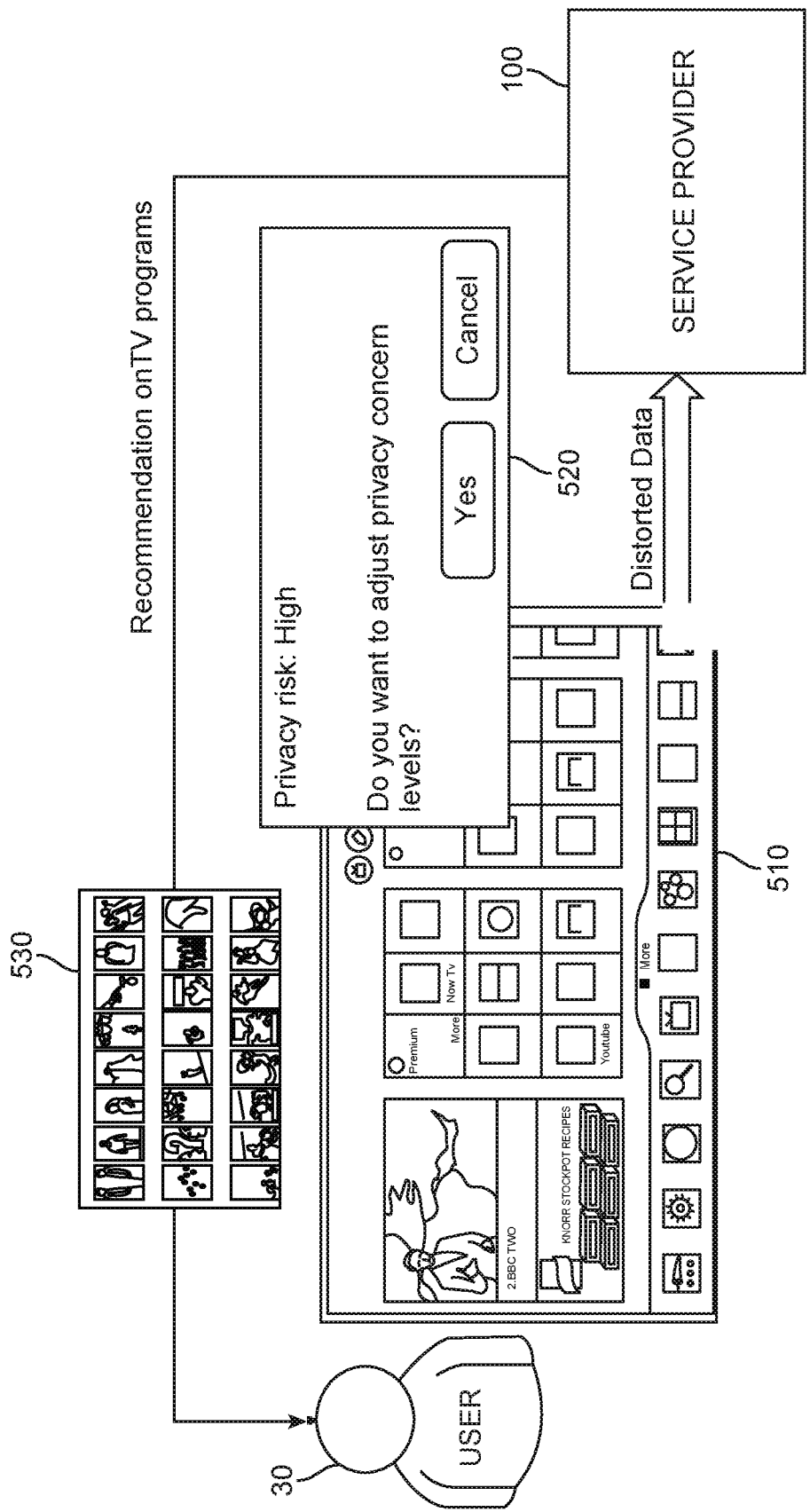
FIG. 9 illustrates a third example user interface generated by the privacy control manager, in one or more embodiments.

FIG. 9 illustrates a third example user interface 510 generated by the privacy control manager 250, in one or more embodiments. When a user 30 launches and starts using an application 260 related to content streaming on his/her electronic client device 50 (e.g., smart television), the privacy control manager 250 generates the user interface 510 listing each type of real-time device sensed data requested by a service provider 100 associated with the application 260. The data requested may include information that the user 30 considers private and from which general private data (e.g., whether the user 30 has children, etc.) may be inferred, such as viewing content history indicating that kids programming (e.g., cartoons) have been viewed, etc. For each type of real-time device sensed data requested, the user 30 can specify a corresponding privacy concern level via another user interface generated by the privacy control manager 250 (e.g., similar to user interface 412 in FIG. 3C).

In one embodiment, the application 260 has a corresponding truncated risk analytics inference model 332. The extent to which on-device reduction is applied to the full risk analytics inference model 331 to obtain the corresponding truncated risk analytics inference model 332 is based on the privacy concern levels specified.

The privacy control manager 250 performs risk assessments on the data requested using the corresponding truncated risk analytics inference model 332, and generates a notification 520 indicating an inference risk level based on the risk assessments. For example, as shown in FIG. 9, the inference risk level identified may be "High". In one embodiment, the notification 520 may also identify one or more types of general private data that may be inferred from the real-time device sensed data requested by the remote service provider 100 (e.g., if the remote service provider 100 requests viewing content history indicating kids programming (e.g., cartoons) has been viewed, the user 30 is notified that the remote service provider 100 may infer that the user 30 has children from the requested data). If the user 30 opts to distort the data requested before release, the privacy control manager 250 performs data distortions on the data requested, and releases the distorted data to the remote service provider 100. The application 260 receives, in return, a service 530 from the remote service provider 100, where the service 530 received comprises television program recommendations based on the distorted data released.

Figure 10:
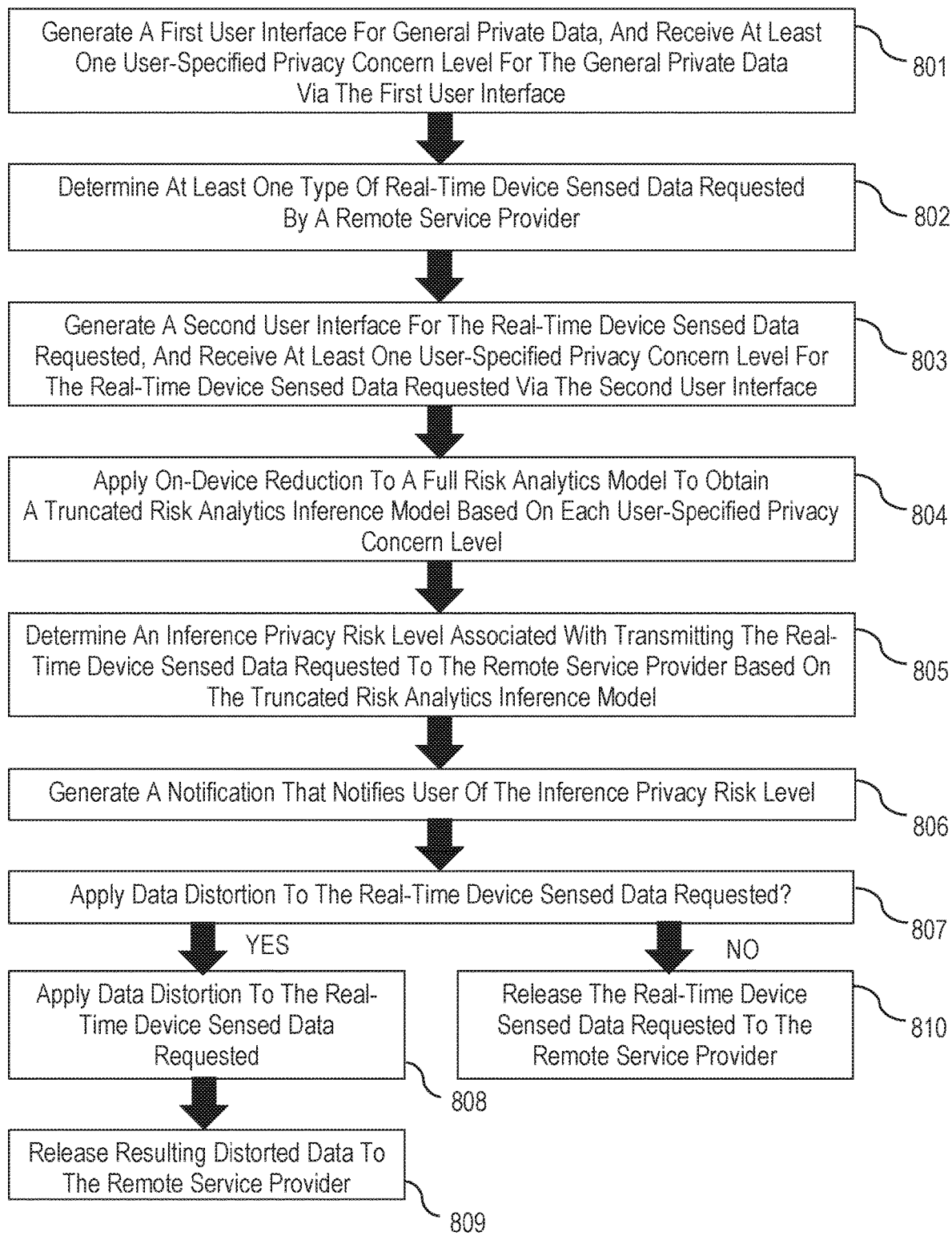
FIG. 10 is an example flowchart of a process performed on a first device to provide data privacy protection of general private data based on automated inference risk assessments and data distortions, in one or more embodiments.

FIG. 10 is an example flowchart of a process 800 performed on a first device to provide data privacy protection of general private data based on automated inference risk assessments and data distortions, in one or more embodiments. In process block 801, generate a first user interface for general private data, and receive at least one user-specified privacy concern level for the general private data via the first user interface. In one embodiment, process block 801 may be performed by the first user interface unit 320.

In process block 802, determine at least one type of real-time device sensed data requested by a remote service provider. In process block 803, generate a second user interface for the real-time device sensed data requested, and receive at least one user-specified privacy concern level for the real-time device sensed data requested via the second user interface. In one embodiment, process blocks 802-803 may be performed by the second user interface unit 310.

In process block 804, apply on-device reduction to a full risk analytics model to obtain a truncated risk analytics inference model based on each user-specified privacy concern level. In process block 805, determine an inference privacy risk level associated with transmitting the real-time device sensed data requested to the remote service provider based on the truncated risk analytics inference model. In one embodiment, process blocks 804-805 may be performed by the privacy risk analysis unit 330.

In process block 806, generate a notification that notifies user of the inference privacy risk level. In process block 807, the notification further prompts the user as to whether he/she wants to apply data distortion to the real-time device sensed data requested. In one embodiment, process blocks 806-807 may be performed by the notification unit 340.

If the user 30 wants to apply data distortion to the real-time device sensed data requested, proceed to process block 808 where data distortion is applied to the real-time device sensed data requested. In process block 809, resulting distorted data is released to the remote service provider. In one embodiment, process blocks 808-809 may be performed by the data distortion engine 351.

If the user 30 does not want to apply data distortion to the real-time device sensed data requested, proceed to process block 810 where the real-time device sensed data requested is released to the remote service provider (i.e., without data distortion). In one embodiment, process block 810 may be performed by the privacy risk analysis unit 330.

Figure 11:
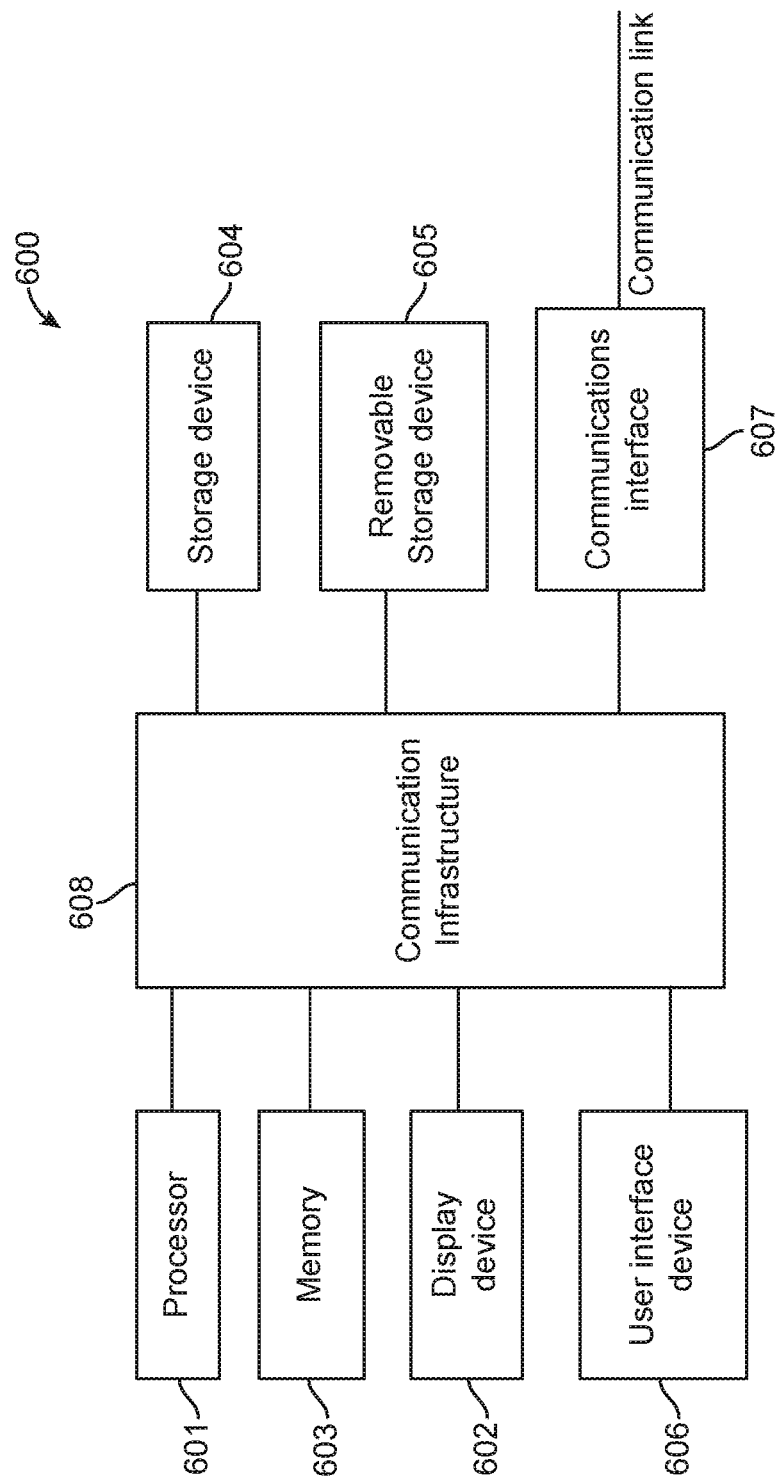
FIG. 11 is a high-level block diagram showing an information processing system comprising a computer system useful for implementing the disclosed embodiments.

FIG. 11 is a high-level block diagram showing an information processing system comprising a computer system 600 useful for implementing the disclosed embodiments. Computer system 600 may be incorporated in a client device 50 or a server device 210. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The main memory 603 may store instructions that when executed by the one or more processors 601 cause the one or more processors 601 to perform operations performed by different components of the privacy control manager 250, such as the operations of the data distortion unit 350.

The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for process 800 (FIG. 10) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method, comprising: at a first device including at least one hardware processor:
   receiving general private data identifying at least one type of privacy-sensitive data to protect;
   collecting at least one type of real-time data, wherein the at least one type of real-time data is different from the general private data;
   determining an inference privacy risk level associated with transmitting the at least one type of real-time data to a second device, wherein the inference privacy risk level indicates a degree of risk of inferring the general private data from transmitting the at least one type of real-time data;
   generating distorted data to release to the second device by applying a data distortion algorithm to at least a portion of the at least one type of real-time data to distort the portion of the at least one type of real-time data to a degree that satisfies a condition based on the inference privacy risk level and a first measure of quality of service predicted from the release, wherein the first measure of quality of service represents utility of the distorted data in providing a service, and the portion of the at least one type of real-time data is distorted to the degree that does not compromise a quality of the service provided;
   transmitting the distorted data to the second device;
   determining the quality of the service provided by the second device in response to the transmitted distorted data; and
   automatically dynamically updating the data distortion algorithm based on one or more changes associated with a service provider providing the service based on the transmitted distorted data and the quality of the service provided, to determine a maximum degree of data distortion that does not compromise the quality of service provided, wherein the one or more changes include additional data requested by the service provider providing a new or updated service.

2. The method of claim 1, wherein the general private data comprises at least one specified privacy concern level for the at least one type of privacy-sensitive data.

3. The method of claim 2, wherein the inference privacy risk level is based in part on the at least one specified privacy concern level for the at least one type of privacy-sensitive data.

4. The method of claim 2, wherein receiving general private data comprises:
   providing an interface on a display of the first device, wherein the interface identifies the at least one type of privacy-sensitive data; and
   receiving, via the interface, the at least one specified privacy concern level for the at least one type of privacy-sensitive data.

5. The method of claim 1, wherein the at least one type of privacy-sensitive data comprises at least one of the following information: racial origin, ethnic origin, one or more political opinions, one or more religious beliefs, one or more philosophical beliefs, one or more health conditions, age, or gender.

6. The method of claim 1, wherein the first device comprises one of the following: a mobile smartphone, a mobile tablet, a computer, a laptop, a smart TV, or a mobile smartwatch.

7. The method of claim 3, further comprising:
at the first device:
maintaining a risk assessment model;
wherein the inference privacy risk level is further based in part on the risk assessment model.

8. The method of claim 1, wherein the quality of the service provided is indicative of a quality of the service received at the first device from the second device in response to the transmitted distorted data, and the second device is the service provider.

9. The method of claim 1, further comprising:
at the first device:
running an application associated with the service provider;
determining which of the at least one type of real-time data is requested by the application;
providing an interface on a display of the first device, wherein the interface comprises a list identifying each type of real-time data requested by the application; and
receiving, via the interface, a specified privacy concern level for each type of real-time data requested by application;
wherein the inference privacy risk level is based in part on each specified privacy concern level for each type of real-time data requested by the application.

10. The method of claim 1, wherein the at least one type of real-time data comprises at least one of the following information captured at the first device: location data, sensor data, or a history of information accessed on the first device.

11. The method of claim 1, wherein generating distorted data further comprises:
providing an interface on a display of the first device, wherein the interface comprises at least one notification of the inference privacy risk level, and at least a portion of the at least one type of real-time data is distorted in response to receiving, via the interface, a request to protect the general private data.

12. The method of claim 1, wherein applying a data distortion algorithm to at least a portion of the at least one type of real-time data comprises:
iteratively selecting a non-private data feature from the at least one type of real-time data that satisfies the condition until a second measure of data leakage of the general private data predicted from release cannot be reduced, wherein each non-private data feature selected is included in a set of non-private data features, the set of non-private data features is released to the second device as the distorted data, and the condition comprises maximizing one of: the first measure of quality of service subject to the second measure of data leakage of the general private data predicted from the release, or the second measure of data leakage of the general private data subject to the first measure of quality of service.

13. The method of claim 7, further comprising:
updating the risk assessment model based on one or more updates received from a server.

14. The method of claim 1, further comprising:
at the first device:
providing a user interface on a display of the first device, wherein the user interface comprises at least one notification of a potential inference privacy risk arising from one or more of the following changes: installation of a new application on the first device, update of an application residing on the first device, and update of a service received from the second device.

15. A system, comprising:
at least one sensor configured to collect at least one type of real-time data;
one or more processors; and
a data storage device storing instructions that when executed by the one or more processors cause the one or more processors to perform operations including:
receiving general private data identifying at least one type of privacy-sensitive data to protect, wherein the at least one type of real-time data is different from the general private data;
determining an inference privacy risk level associated with transmitting the at least one type of real-time data to a first device, wherein the inference privacy risk level indicates a degree of risk of inferring the general private data from transmitting the at least one type of real-time data;
generating distorted data to release to a second device by applying a data distortion algorithm to at least a portion of the at least one type of real-time data to distort the portion of the at least one type of real-time data to a degree that satisfies a condition based on the inference privacy risk level and a first measure of quality of service predicted from the release, wherein the first measure of quality of service represents utility of the distorted data in providing a service, and the portion of the at least one type of real-time data is distorted to the degree that does not compromise a quality of the service provided;
transmitting the distorted data to the second device;
determining the quality of the service provided by the second device in response to the transmitted distorted data; and
automatically dynamically updating the data distortion algorithm based on one or more changes associated with a service provider providing the service based on the transmitted distorted data and the quality of the service provided, to determine a maximum degree of data distortion that does not compromise the quality of service provided, wherein the one or more changes include additional data requested by the service provider providing a new or updated service.

16. The system of claim 15, wherein the general private data comprises at least one specified privacy concern level for the at least one type of privacy-sensitive data.

17. The system of claim 16, wherein the inference privacy risk level is based in part on the at least one specified privacy concern level for the at least one type of privacy-sensitive data.

18. The system of claim 16, further comprising:
a display;
wherein receiving general private data comprises:
providing an interface on the display, for identifying the at least one type of privacy-sensitive data; and
receiving, via the interface, the at least one specified privacy concern level for the at least one type of privacy-sensitive data.

19. The system of claim 15, further comprising:
a display;
wherein generating distorted data further comprises providing an interface on the display, the interface comprising at least one notification of the inference privacy risk level, and at least a portion of the at least one type of real-time data is distorted in response to receiving, via the interface, a request to protect the general private data.

20. A non-transitory computer readable storage medium including instructions that when executed by a processor performs a method comprising:
   receiving general private data identifying at least one type of privacy-sensitive data to protect;
   collecting at least one type of real-time data, wherein the at least one type of real-time data is different from the general private data;
   determining an inference privacy risk level associated with transmitting the at least one type of real-time data to a first device, wherein the inference privacy risk level indicates a degree of risk of inferring the general private data from transmitting the at least one type of real-time data;
      generating distorted data to release to the second device by applying a data distortion algorithm to at least a portion of the at least one type of real-time data to distort the portion of the at least one type of real-time data to a degree that satisfies a condition based on the inference privacy risk level and a first measure of quality of service predicted from the release, wherein the first measure of quality of service represents utility of the distorted data in providing a service, and the portion of the at least one type of real-time data is distorted to the degree that does not compromise a quality of the service provided;
   transmitting the distorted data to the second device;
   determining the quality of the service provided; and
   automatically dynamically updating the data distortion algorithm based on one or more changes associated with a service provider providing the service based on the transmitted distorted data and the quality of the service provided, to determine a maximum degree of data distortion that does not compromise the quality of service provided, wherein the one or more changes include additional data requested by the service provider providing a new or updated service.

* * * * *